Patented Feb. 24, 1931

1,794,218

UNITED STATES PATENT OFFICE

HERMANN WAGNER, OF SODEN-ON-THE-TAUNUS, AND HEINZ EICHWEDE AND ERICH FISCHER, OF HOCHST-ON-THE-MAIN, GERMANY, ASSIGNORS TO GENERAL ANILINE WORKS, INC., OF NEW YORK, N. Y., A CORPORATION OF DELAWARE

PYRAZOLONE AZO DYESTUFFS AND PROCESS FOR PREPARING THE SAME

No Drawing. Application filed November 15, 1926, Serial No. 148,605, and in Germany November 19, 1925.

Our present invention relates to new pyrazolone azodyestuffs and process for making the same.

We have found that valuable azo dyestuffs, which are suitable for the dyeing of fibers of all kinds or for use as color lakes, are obtainable by coupling any diazo-compound with a compound of the general formula

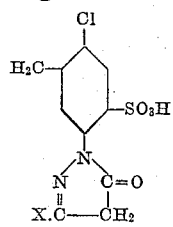

wherein X represents a methyl-, carboxylic acid- or a carboxylic acid ester group. These compounds, which have not yet been described, are obtainable in the known manner by condensing the hydrazine with acetoacetic ester or oxalacetic ester. Our new azo dyestuffs correspond to the general formula

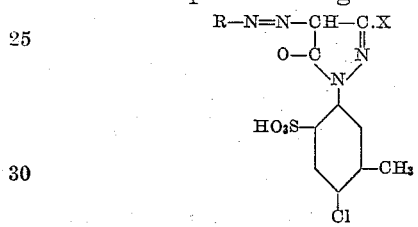

wherein X represents a methyl-, carboxylic acid- or a carboxylic acid ester group and R represents any aromatic nucleus substituted or not.

The following examples serve to illustrate our invention but they are not intended to limit it thereto, all parts being by weight.

1. 383.5 parts of the sodium salt of 1-(4'-chlor-5'-methyl-2'-sulfophenyl)-5-pyrazolone-3-carboxylic acid ethylester are dissolved in water and mixed with an excess of a sodium acetate solution. Into the solution thus prepared is run a diazo compound produced in the known manner from 173 parts of orthoanilinesulfonic acid. The dyestuff after being completely separated with potassium chloride, filtered and dried, forms a pure yellow powder which dyes wool a greenish-yellow tint of excellent properties as to fastness. It has the probable formula:

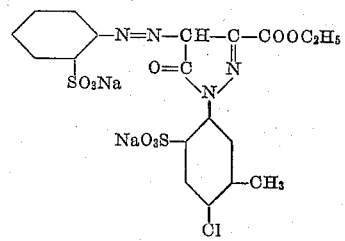

If the ethylester used in the above example is replaced by another ester, for instance methylester, butylester or the like, similar dyestuffs are obtained.

2. By causing a diazo solution, produced in the usual manner from 93 parts of aniline, to act upon the solution of the 1-(4'-chlor-5'-methyl-2'-sulfophenyl) 5-pyrazolone-3-carboxylic acid ethyl-ester obtained according to Example 1, a dyestuff is obtained which also gives on wool a pleasing level yellow tint.

It has the probable formula:

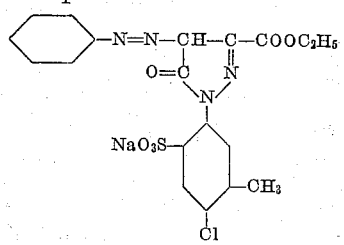

3. 325.5 parts of the sodium salt of 1-(4'-chlor-5'-methyl-2'-sulfophenyl) 3-methyl-5-pyrazolone are prepared for being coupled in the manner indicated in Example 1. With this solution is combined a diazo solution, obtained in the usual manner from 207.5 parts of 4-chlor-1-aminobenzene-2-sulfonic acid. The resulting dyestuff separates already during the coupling process and it also gives on wool a very fast greenish-yellow tint.

It has the probable formula:

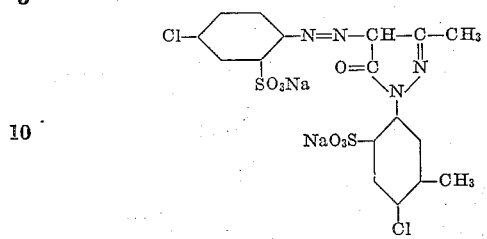

4. A diazo solution obtained in the usual manner from 266 parts of 2-amino-1-toluene-3.5-disulphonic acid is caused to act upon a solution of 355.5 parts of the sodium salt of 1-(4'-chlor-5'-methyl-2'-sulfophenyl)5-pyrazolone-3-carboxylic acid produced according to Example 1. When the coupling process is complete, the dyestuff is separated by adding potassium chloride and dried. This dyestuff dyes wool a greenish-yellow tint of excellent fastness to light.

It has the probable formula:

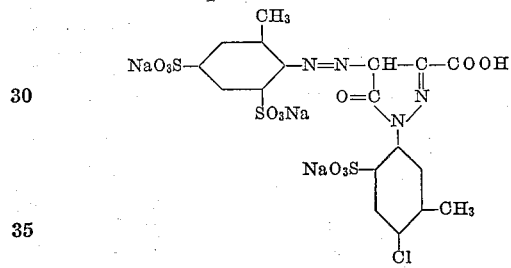

The dyestuff is also suitable for being used as a lake-dye, which is, when prepared with barium sulfate, remarkable for its greenish tint.

5. In a tetrazo solution obtained in the known manner from 226 parts of 4.4' diaminodiphenyldimethylmethane, is combined with a solution of 661 parts of the sodium salt of 1-(4'-chlor-5'-methyl-2'-sulfophenyl)-3-methyl-5-pyrazolone, obtained according to Example 3 and Example 1 respectively, a yellow dyestuff is obtained which, owing to its good fastness to milling and washing, is particularly suitable for being used in the dyeing of yarn.

It has the probable formula:

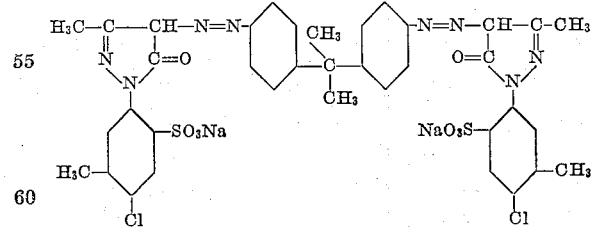

Instead of the diazo compound mentioned in the foregoing examples, any other diazo compounds may be used; if they contain any further groups capable of being chromed, the fastness of the dyeings can be enhanced in the known manner by an after-treatment with a chromium salt.

We claim:

1. The process which comprises diazotizing 4-chloro-1-amino-benzene-2-sulfonic acid and coupling the diazo compound thus obtained with the pyrazolone of the following constitution:

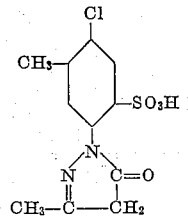

2. As a new product, the pyrazolone azo-dyestuff of the formula:

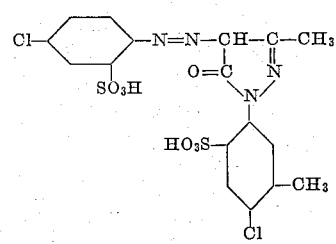

3. The process which comprises coupling any diazo compound with a compound of the general formula:

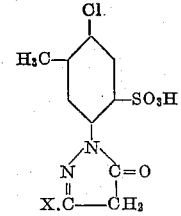

wherein X represents a methyl-, carboxylic acid- or a carboxylic acid ester group.

4. The process which comprises diazotizing a compound of the general formula:

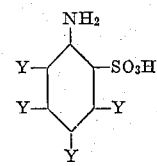

wherein Y represents hydrogen or a monovalent substituent and coupling the diazo compound thus obtained with a compound of the general formula:

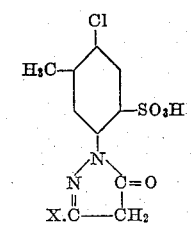

wherein X represents a methyl-, carboxylic acid and a carboxylic acid ester group.

5. The process which comprises diazotizing a compound of the general formula:

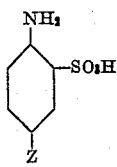

wherein Z represents hydrogen or halogen and coupling the diazo compound thus obtained with a compound of the general formula:

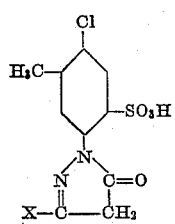

wherein X represents a methyl-, carboxylic acid or a carboxylic acid ester group.

6. The process which comprises diazotizing a compound of the general formula:

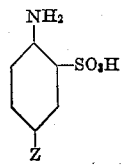

wherein Z represents hydrogen or halogen and coupling the diazo compound thus obtained with the compound of the probable formula:

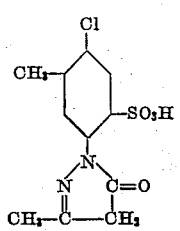

7. As new products the azo dyestuffs of the general formula:

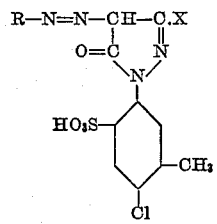

wherein X represents a methyl-, carboxylic acid- or a carboxylic acid ester group and R represents any aromatic nucleus substituted or not.

8. As new products the azo dyestuffs of the general formula:

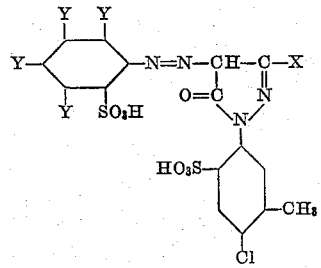

wherein X represents a methyl-, carboxylic acid- or a carboxylic acid ester group and Y represents hydrogen or a monovalent substituent.

9. As new products the azo dyestuffs of the general formula:

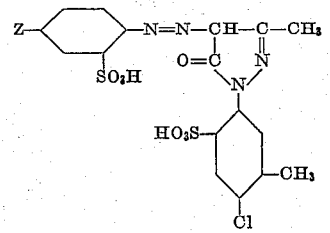

wherein Z represents hydrogen or halogen.

In testimony whereof, we affix our signatures.

HERMANN WAGNER.
HEINZ EICHWEDE.
ERICH FISCHER.